United States Patent
Wu et al.

(10) Patent No.: US 7,036,489 B1
(45) Date of Patent: May 2, 2006

(54) EXHAUST SYSTEM AND METHODS OF NOX ADSORBER DESULFATION

(75) Inventors: Ming-Cheng Wu, Troy, MI (US); Taeyoung Han, Bloomfield Hills, MI (US); Galen B. Fisher, Bloomfield Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/130,706

(22) Filed: May 17, 2005

(51) Int. Cl.
*F02M 33/02* (2006.01)

(52) U.S. Cl. .................................. 123/519

(58) Field of Classification Search ............... 123/518, 123/519, 434, 672, 676, 704, 444, 480; 60/286, 60/274, 295, 301
See application file for complete search history.

(56) References Cited

U.S. PATENT DOCUMENTS

| | | | |
|---|---|---|---|
| 6,526,950 B1 * | 3/2003 | Ito et al. ..................... | 123/518 |
| 6,679,224 B1 * | 1/2004 | Stanglmaier ................ | 123/431 |
| 6,832,473 B1 * | 12/2004 | Kupe et al. ................. | 60/286 |
| 2001/0035006 A1 * | 11/2001 | Dou et al. ..................... | 60/274 |

OTHER PUBLICATIONS

N. Takahashi, H. Shinjoh, T. Iijima, T. Suzuki, K. Yamazaki, K. Yokota, H. Suzuki, N. Miyoshi, S. Matsumoto, T. Tanizawa, T. Tanaka, S. Tateishi, K. Kasahara, Catal. Today, vol. 27 (1996) 63-69.

E. Fridell, B. Westerberg, A. Amberntsson, and M. Skoglundh, topics in catalysis, vol. 16/17 (2001) 133.

S. Matsumoto, Y. Ikeda, H. Suzuki, M. Ogai, and N. Miyoshi, $NO_x$ storage reduction catalyst for automotive exhaust with improved tolerance against sulfur poisoning, Appl. Catalysis B-Environmental, vol. 25, 2000, pp. 115-124.

G. Corro, Sulfur impact on diesel emission control-A review, Reaction Kinetics Catalysis Lett., vol. 75, 2002, pp. 89-106.

A. Amberntsson, M. Skoglundh, M. Jonsson, E. Fridell, Investigations of sulfur deactivation of $NO_x$ storage catalysts: influence of sulfur carrier and exposure conditions, Catalysis Today, vol. 73, 2002, pp. 279-286.

(Continued)

*Primary Examiner*—Bibhu Mohanty
(74) *Attorney, Agent, or Firm*—Paul L. Marshall

(57) ABSTRACT

In one embodiment, the method for operating an exhaust system can comprise determining a stream temperature of an exhaust stream, and desulfating the NOx adsorber. Desulfating the NOx adsorber can comprise determining an amount of oxygen needed to increase an initial temperature of a NOx adsorber to a desulfation temperature of greater than or equal to about 600° C., producing reformate comprising hydrogen and carbon monoxide in an on-board reformer, introducing the amount of oxygen to the NOx adsorber, and introducing a sufficient amount of reformate to the NOx adsorber to attain an air to fuel ratio that is less than a combustion stoichiometric A/F ratio.

20 Claims, 4 Drawing Sheets

OTHER PUBLICATIONS

J.P. Breen, M. Marella, C. Pistarino, J. R. H. Ross, Sulfur-tolerant $NO_x$ storage traps: an infrared and thermodynamic study of the reactions of alkali and alkaline-earth metal sulfates, Catalysis Lett., vol. 80, 2002, pp. 123-128.

A. V. Golovin and J. R. Asik, Modeling and experiments for lean $NO_x$ trap desolation by high frequency A/F modulation, SAE 2000-01-1201.

J. R. Asik, G. M. Meyer, and D. Dobson, Lean $NO_x$ trap desulfation through rapid air fuel modulation, SAE 2000-01-1200.

T. V. Johnson, Diesel emission control in review-the last 12 months, SAE 2003-01-0039.

T. Collier, M. Brogan, P. Retman, and R. Bye, Development of a rapid sulfation technique and fundamental investigations into desulfation process, SAE 2003-01-1162.

D. Dou and O. H. Bailey, Investigation of $NO_x$ adsorber catalyst deactivation, SAE 982594.

D. Dou and J. Balland, Impact of alkali metals on the performance and mechanical properties of $NO_x$ adsorber catalysts, SAE 2002-01-0734.

* cited by examiner

EXHAUST SYSTEM AND METHODS OF NOX ADSORBER DESULFATION

BACKGROUND

Internal combustion engines produce many by-products as a result of burning hydrocarbon fuels such as, particulate matter, unburned hydrocarbons (HC), hydrogen ($H_2$), carbon monoxide (CO), carbon dioxide ($CO_2$), nitric oxide (NO), and nitrogen dioxide ($NO_2$). Although significant advancements have been made in reducing particulate, HC, and CO emissions, there is still a need to develop systems that further reduce the emission of nitrogen oxides (also known as NOx). Devices, such as NOx adsorbers (also known as NOx Traps), and Selective Catalytic Reduction catalysts (SCR) are being developed to accomplish this goal.

NOx adsorbers assist in reducing NOx emissions by storing nitrogen dioxide as nitrates on a catalytic substrate, which contains absorbent materials, during fuel-lean conditions and releasing the nitrates as nitrogen oxides and oxygen during fuel-rich conditions. Once released, the catalytic substrate converts the nitrogen oxides and oxygen into nitrogen ($N_2$) and water ($H_2O$).

NOx adsorbers significantly reduce NOx emissions. However, their susceptibility to sulfur poisoning is a major technical problem. Sulfur, which is commonly found in trace amounts in diesel fuel, binds to the nitrate sites on the NOx adsorbers' catalytic substrate in the form of sulfates ($SO_4$). Because sulfates are more stable than nitrates and carbonates, sulfur species are not released during the fuel-rich regeneration process when carbon dioxide and nitrogen oxides are released; i.e., in the regular operation temperature range for NOx adsorbers of 150° C. to 500° C. Accumulating over time, sulfates significantly decrease the ability of NOx adsorber to store and release nitrogen dioxide. This results in an overall decreased efficiency of the NOx abatement system and an increase in NOx emissions.

Maintaining NOx adsorber efficiency enables proper function of NOx abatement systems that employ these devices. Therefore, there is significant need to develop methods that will remediate sulfur poisoning of NOx adsorber devices.

BRIEF SUMMARY

Disclosed herein are methods for operating exhaust systems, methods for desulfurization systems, equipment for performing the same.

In one embodiment, the method for operating an exhaust system can comprise determining a stream temperature of an exhaust stream, and desulfating the NOx adsorber. Desulfating the NOx adsorber can comprise determining an amount of oxygen needed to increase an initial temperature of a NOx adsorber to a desulfation temperature of greater than or equal to about 600° C., producing reformate comprising hydrogen and carbon monoxide in an on-board reformer, introducing the amount of oxygen to the NOx adsorber, and introducing a sufficient amount of reformate to the NOx adsorber to attain an air to fuel ratio that is less than a combustion stoichiometric A/F ratio. The oxygen and reformate can react, creating an exotherm and increasing the temperature of the NOx adsorber to the desulfation temperature. At the desulfation temperature, a sulfur material in the NOx adsorber can be released and can react with the reformate.

In another embodiment, the method for operating an exhaust system can comprise: normally operating the exhaust system, regenerating a NOx adsorber, and desulfating the NOx adsorber. Normally operating the exhaust system can comprise: introducing a lean exhaust stream to the NOx adsorber, and adsorbing NOx from the lean exhaust stream in the NOx adsorber. Regenerating the NOx adsorber can comprise: introducing a rich exhaust stream to the NOx adsorber; and desorbing NOx. Desulfating can comprise: determining an amount of oxygen needed to increase an initial temperature of a NOx adsorber to a desulfation temperature of greater than or equal to about 600° C.; producing reformate comprising hydrogen and carbon monoxide in an on-board reformer; introducing the amount of oxygen to the NOx adsorber; introducing a sufficient amount of reformate to the NOx adsorber to attain an air to fuel ratio that is less than a combustion stoichiometric A/F ratio. The oxygen and reformate can react, creating an exotherm and releasing a sulfur material.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Disclosed herein are methods for desulfating a NOx adsorber(s) within diesel exhaust treatment systems. More specifically, a method is disclosed where the composition of an exhaust stream is adjusted to support an exothermic reaction that is capable of raising the temperature of a NOx absorber's catalytic substrate to a point favorable for release of bound sulfates.

Furthermore, a process has been developed that can analyze the efficiency of a NOx adsorber, determine if the NOx adsorber's efficiency has fallen below a preset threshold, evaluate if operating conditions favor a desulfation cycle, determine if a desulfation cycle will be initiated to regenerate the NOx adsorber catalytic substrate, and initiate the desulfation cycle.

Specific quantities and ranges are discussed herein. All ranges disclosed are inclusive and combinable (e.g., ranges of "up to about 25 wt %, with about 5 wt % to about 20 wt % desired", is inclusive of the endpoints and all intermediate values of the ranges of "about 5 wt % to about 25 wt %," etc). Furthermore, the terms "a" and "an" herein do not denote a limitation of quantity but rather denote the presence of the referenced entity.

Figure 1:
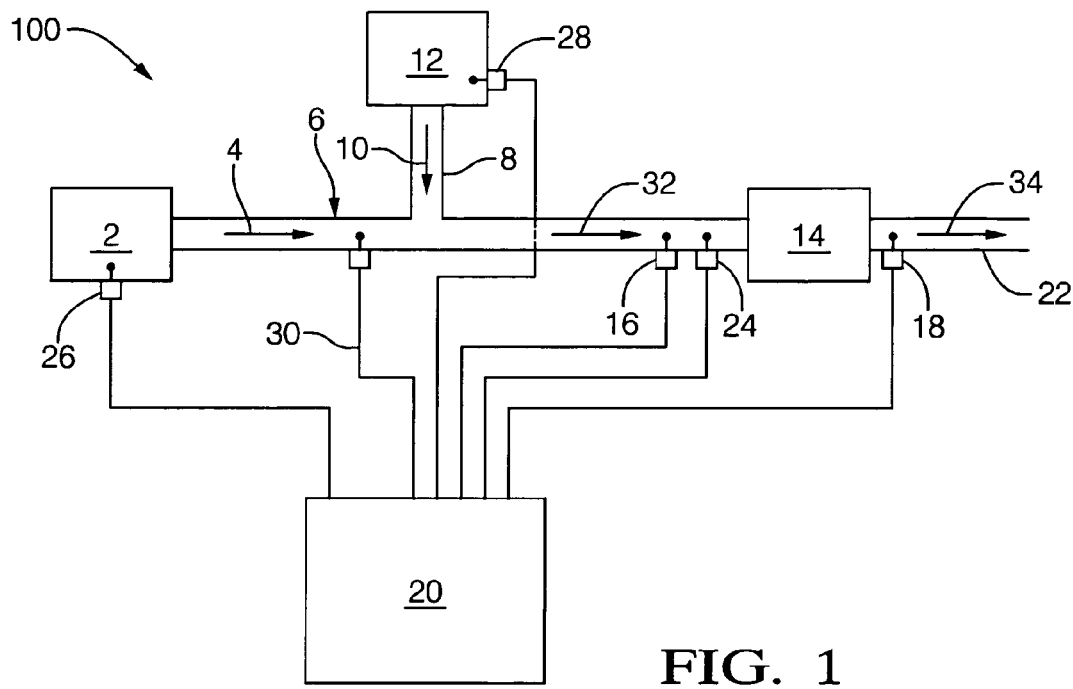
FIG. 1 is an illustration of an exemplary NOx adsorber desulfation system.

Referring now to FIG. 1, an exemplary desulfation system, generally designated 100, is illustrated. Exhaust source 2 produces an exhaust stream 4 that flows within an exhaust conduit 6. Reformate conduit 8 is connected to, and in fluid communication with exhaust conduit 6. An off-line reformer 12 produces reformate 10 that flows from the device through reformate conduit 8 and mixes with exhaust stream 4 producing exhaust/reformate mixture 32.

NOx adsorber 14 is disposed downstream from the junction of reformate conduit 8 and exhaust conduit 6 and therefore in fluid communication with exhaust/reformate mixture 32. Outlet conduit 22 is downstream from, connected to, and in fluid communication with NOx adsorber 14.

Disposed upstream from NOx adsorber 14, connected to exhaust conduit 6, and in fluid communication with exhaust/reformate mixture 32 is upstream NOx sensor 16. Disposed downstream from NOx adsorber 14, connected to outlet conduit 22, and in fluid communication with adsorber exhaust 34, is downstream NOx sensor 18.

Oxygen sensor 30 is connected to exhaust conduit 6, in fluid communication with exhaust stream 4, and disposed upstream of reformate conduit 8. Temperature sensor 24 is connected to NOx adsorber 14 and in fluid communication with exhaust/reformate mixture 32 therein.

Furthermore, upstream NOx sensor 16 and downstream NOx sensor 18 (hereinafter may be referred to as "the NOx sensors") are connected in electrical communication to a process controller 20. Process controller 20 is also connected in electrical communication to temperature sensor 24, to engine sensor/controller 26, reformer sensor/controller 28, and oxygen sensor 30. Process controller 20 is capable of controlling the operation of reformer 12 utilizing reformer sensor/controller 28, and controlling the operation of exhaust source 2 utilizing engine sensor/controller 26.

In order to perform the prescribed functions and desired processing, as well as the computations therefore (e.g., the control algorithms for desulfation, normal operation, regeneration, and the like), process controller 20 can include, but is not limited to, a processor(s), computer(s), memory, storage, register(s), timing, interrupt(s), communication interfaces(s), and input/output signal interfaces, and the like, as well as combinations comprising at least one of the foregoing. For example, process controller 20 can include input signal processing and filtering to enable accurate sample and conversion of acquisitions of such signals from various sensor(s).

The desulfation system 100, illustrated in FIG. 1, has various modes of operation. A first mode of operation, referred to as "normal operating mode", a second mode of operation, referred to as "regeneration", and a third mode of operation referred to as "desulfation cycle". During normal operating mode, exhaust source 2 (e.g., a diesel engine, internal combustion engine, or the like) produces a fuel-lean exhaust stream 4 with an air to fuel mixture (A/F), for example, of about 20 to about 40.

Exhaust stream 4 flows through exhaust conduit 6 and into NOx adsorber 14. Within NOx adsorber 14, nitric oxide from the exhaust stream is oxidized to form nitrogen dioxide, which is adsorbed in NOx adsorber 14. After operating under normal operating mode for a period of time, NOx adsorber 14 becomes saturated with nitrogen dioxide and/or nitrates. Regeneration is employed to remove the nitrogen dioxide from the NOx adsorber 14. During regeneration a fuel-rich exhaust stream 7 is supplied to NOx adsorber 14 (e.g., for a short duration of time) to cause nitrogen dioxide to desorb and react to form nitrogen and water.

The fuel-rich condition can be attained by operating the exhaust source 2 so as to produce a low air to fuel ratio, and/or by introducing reformate to the exhaust stream 4. Since operation of the exhaust source 2 to produce a low air to fuel ratio (A/F) is inefficient, the reformer 12 can be employed to produce a reformate, comprising primarily carbon monoxide and hydrogen, and introduce the reformate into the exhaust stream 4 to form an exhaust/reformate mixture 32. The exhaust/reformate mixture 32 is a fuel-rich (oxygen poor) condition that enables regeneration of NOx adsorber 14. During regeneration, the exhaust stream comprises about 1 vol. % to 4 vol. % oxygen, and the NOx adsorber has a temperature of about 200° C. to about 500° C.

It is noted that although the fuel-rich condition can be attained by the introduction of reformate into exhaust stream 4, operating exhaust source 2 to produce first a lean exhaust having a low air to fuel ratio (e.g., an air to fuel ratio of about 16 to about 18) enables reduced (e.g., efficient) usage of reformats. For internal combustion engines such as diesel engines, a low air to fuel ratio exhaust can be produced by use of exhaust gas recirculation (EGR) and/or intake air throttling.

When the NOx adsorber 14 attains a saturation point (e.g., a chosen saturation level), controller 20 can signal the reformer 12 to supply a sufficient quantity of reformate via reformer sensor/controller 28. The amount, duration, and frequency of reformate supplied can be predetermined (e.g., based upon time, engine usage, flow rates, temperatures, A/F, load, rpm's, and the like, as well as combinations comprising at least one of the foregoing), calculated using process sensors (e.g. NOx sensors, engine sensor/controller 26, temperature sensor 24, reformer sensor/controller 28, and/or the like), or manually conducted. The regeneration itself can be based upon the introduction of a set amount of reformate, for a set period of time, can be cyclic, and/or the like.

Desulfation system 100 alternates between normal operating mode and regeneration mode to enhance the NOx removal from the exhaust stream 4. During both modes of operation, sulfur present in the fuel flows into NOx adsorber 14 as a component of exhaust stream 4. The sulfur adsorbs as sulfates on the NOx adsorber 14's nitrogen dioxide adsorption sites. Once formed, these sulfates cannot be readily purged from the catalytic surface during a regeneration cycle due to their high stability. However, the NOx adsorber can periodically be desulfated in a desulfation cycle.

Specifically, during a desulfation cycle the temperature of the NOx adsorber's catalytic substrate is increased by an exothermic reaction within the NOx adsorber resulting from adjusting the exhaust/reformate mixture 32 to a composition favorable for supporting this reaction, e.g., the "heating phase". To heat the NOx adsorber 14 to desulfation temperatures, sufficient oxygen is introduced to the NOx adsorber to increase the NOx adsorber temperature to a desire desulfation temperature. The amount of oxygen can be determined using a look up table based upon the operation of the exhaust system (e.g., time, flow rates, and the like), or can be based upon the current temperature of the exhaust stream and/or the NOx adsorber, and the desired desulfation temperature; e.g., to raise the temperature of the NOx adsorber from its initial (e.g., normal operating) temperature, to the desulfation temperature. The amount of oxygen can be, for example, about 5 volume percent (vol %) to about 11 vol %, or, more specifically, about 6 vol % to about 9 vol %, or, even more specifically, about 7 vol % to about 8 vol. %, based upon a total volume of the exhaust stream. For example, exhaust stream 4 can be supplied at an air to fuel ratio of about 20 to about 24 during heating of the NOx adsorber to desulfation temperatures.

Reformate is also introduced to the NOx adsorber. Sufficient reformats is introduced to the NOx adsorber such that, with the sufficient oxygen, the gas within the NOx adsorber has an air to fuel ratio that is initially lean, e.g., near an air to fuel ratio (A/F) that greater than combustion stoichiometry A/F ratio, e.g., about 15 to about 16. To attain the desired exotherm and desulfation, the amount of reformate introduced to the exhaust stream 4 during a desulfation cycle is higher than that introduced during the regeneration cycle.

The exhaust/reformate mixture 32, in contact with catalyst components (e.g., Pt) in the NOx adsorber 14 produces an exotherm that raises the temperature of the NOx adsorber from the normal operating temperature (e.g., less than or equal to 400° C. for a diesel engine system) to desulfation temperatures (e.g., a temperature of greater than 600° C.). The exotherm can be employed to raise the temperature of the NOx adsorber 14 to greater than or equal to about 600° C., or, more specifically, greater than or equal to about 650° C. or, even more specifically, greater than or equal to about 700° C. In order to avoid catalyst damage, the desulfation temperature can be less than or equal to about 850° C., or, more specifically, less than or equal to about 800° C., or, even more specifically, less than or equal to about 750° C. At these temperatures, in a fuel rich stream, sulfur is released from the nitrate sites as a sulfur material (e.g., hydrogen sulfide, sulfur dioxide, possibly COS, and the like).

The reformate flow can then be adjusted to attain a fuel rich environment, e.g., a mixed stream having an A/F ratio that is less than the combustion stoichiometric A/F ratio. For example, the fuel rich stream can have an air to fuel ratio of about 7 to less than the combustion stoichiometric A/F ratio (e.g., for diesel fuel stoichiometric A/F=14.8, for gasoline=14.6, varying slightly for the exact fuel composition) (or lambda of about 0.50 to about 0.99 with lambda being the normalized air to fuel ratio), or, more specifically an air to fuel ratio of about 12 to less than the combustion stoichiometric A/F ratio (or lambda of about 0.80 to about 0.99), or even more specifically an air to fuel ratio of about 13 to less than the combustion stoichiometric A/F ratio (or lambda of about 0.90 to about 0.99). For example, the amount of reformate introduced to the exhaust stream 4 during a desulfation cycle lowers the air to fuel ratio of the exhaust/reformate mixture to close to the ideal combustion stoichiometry.

In another embodiment, the amount of reformate introduced to exhaust stream 4 during a desulfation cycle can lower the air to fuel ratio of the exhaust/reformate mixture to less than the ideal combustion stoichiometry to attain desulfation temperatures and rich conditions in a single step.

The frequency, duration, and end point of any phase (i.e., heating phase, rich phase, and the like), step, or sub-routine within the desulfation cycle can be predetermined (based upon time, engine usage, flow rates, temperatures, A/F, load, rpm's, NOx, $O_2$, and the like, as well as combinations comprising at least one of the foregoing), based on continuous or periodic monitoring (utilizing NOx sensors, engine sensor/controller 26, temperature sensor 24, reformer sensor/controller 28, and the like, and combinations comprising at least one of the foregoing).

It is noted that the air fuel ratio of the exhaust/reformate mixture 32 can be adjusted during the various modes of operation to enhance the particular reactions desired.

In a second embodiment of the desulfation system 100 illustrated in FIG. 1, the desulfation system 100 could incorporate a "desulfation schedule" or "desulfation program", e.g., executed by process controller 20, that measures NOx adsorber 14 efficiency (e.g., periodically or continuously) and/or operating conditions (such as temperatures, flow rates, A/F, load, rpm's, NOx, $O_2$, reformate, and the like, as well as combinations comprising at least one of the foregoing). The measurement(s) enable process controller 20 to determine when to initiate a desulfation cycle, (e.g., when it is desirable and whether operating conditions favor a desulfation), e.g., by comparing these measurements to a threshold. The threshold(s) can be any stored, referenced, programmed, measured, processed, acquired, or calculated, number, value, voltage, current, resistance, result, signal, interface, and the like, as well as combinations comprising at least one of the foregoing, that can be used by process controller 20 to carry out its function.

For example, in one embodiment, a threshold of 70% efficiency can be programmed into process controller 20. The efficiency of NOx adsorber 14 can then be determined by process controller 20 utilizing upstream NOx sensor 16 and downstream NOx sensor 18. If the amount of NOx exiting the NOx adsorber 14 is less than or equal to 30% of NOx entering NOx adsorber 14, the desulfation system 100 remains in normal operating mode. If, however, more than 30% of the NOx entering the NOx adsorber remains in the exhaust stream 4 exiting NOx adsorber 14, a desulfation schedule can be initiated.

Figure 2:
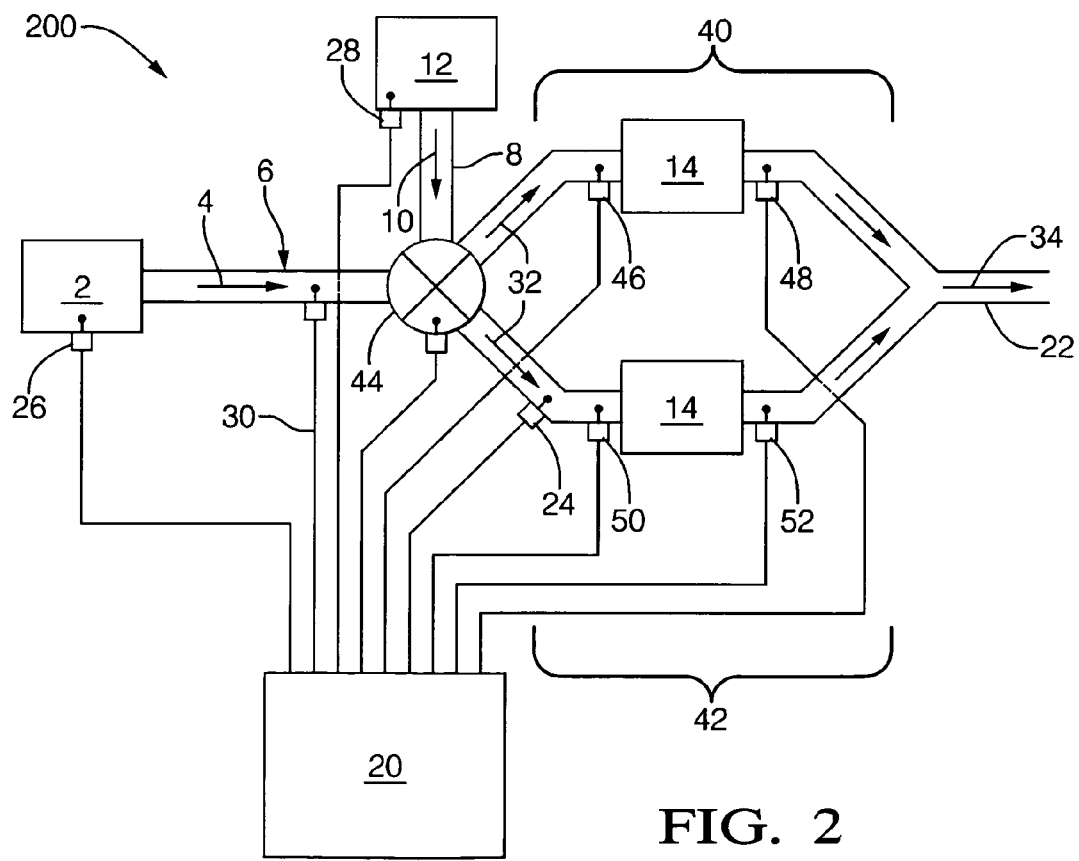
FIG. 2 is an illustration of an exemplary NOx adsorber desulfation system with multiple flow channels.

Referring now to FIG. 2, an exemplary desulfation system, generally designated 200, is illustrated. Engine 2 produces an exhaust stream 4 that flows within an exhaust conduit 6. Exhaust conduit 6 is connected to and in fluid communication with flow diverter 44. A reformer 12 produces reformate 10 that exits the device through reformate conduit 8 that is coupled to and in fluid communication with flow diverter 44. Flow diverter 44 is capable of controlling fluid communication between the conduits connected thereto (e.g., full, partial, or no fluid communication).

Flow diverter 44 is in fluid communication with by-pass circuit 40 and by-pass circuit 42. A NOx adsorber 14 is disposed within both by-pass circuits 40,42, and the by-pass circuits 40,42 are connected to and in fluid communication with outlet conduit 22, which can optionally be in fluid communication with an SCR catalyst (no shown). Adsorber exhaust 34 flows downstream from NOx adsorbers 14 within by-pass circuit 40 and/or 42 and exits desulfation system 200 via outlet conduit 22.

Disposed upstream from NOx adsorber 14 and connected to by-pass circuit 40 and in fluid communication with exhaust/reformate mixture 32 is upstream NOx sensor 46. Disposed downstream from NOx adsorber 14 and connected to by-pass circuit 40 and in fluid communication with adsorber exhaust 34 is downstream NOx sensor 48. Similarly, disposed upstream from NOx adsorber 14 and connected to by-pass circuit 42 and in fluid communication with exhaust/reformate mixture 32 is upstream NOx sensor 50. Disposed downstream from NOx adsorber 14 and connected to by-pass circuit 42 and in fluid communication with adsorber exhaust 34 is downstream NOx sensor 52.

Oxygen sensor 30 is connected to exhaust conduit 6, in fluid communication with exhaust stream 4, and disposed upstream of flow diverter 44. Temperature sensor 24 is connected to NOx adsorber 14 and in fluid communication with exhaust/reformate mixture 32.

Upstream NOx sensors 46, 50, and downstream NOx sensors 48, 52 (the "NOx sensors") are connected in electrical communication to process controller 20. Process controller 20 is also connected in electrical communication to temperature sensor 24, engine sensor/controller 26, reformer sensor/controller 28, and oxygen sensor 30. The process controller 20 is also in operable communication with flow diverter 44, and is capable of controlling its operation.

Process controller 20 is also capable of controlling the operation of reformer 12, e.g., utilizing reformer sensor/controller 28, and controlling the operation of exhaust source 2, e.g., utilizing engine sensor/controller 26.

The desulfation system 200 illustrated in FIG. 2 generally has three modes of operation, similar to the desulfation system 100 of FIG. 1; "normal operating mode", "regeneration", and "desulfation cycle".

During normal operating mode, exhaust source 2 produces a fuel-lean exhaust stream 4 that flows through exhaust conduit 6 and is directed into by-pass conduit 40 and by-pass circuit 42 by flow diverter 44. NOx adsorbers 14 disposed in by-pass conduit 40 and NOx adsorber 14 disposed in by-pass circuit 42 oxidizes and adsorbs NOx on nitrate sites. After a period of time the NOx adsorbers' catalytic substrates become saturated. Once the saturation level has been reached, process controller 20 can initiate regeneration by causing reformer 12 to produce reformate 10, and introduce the reformate into exhaust stream 4 via flow diverter 44 to produce an exhaust/reformate mixture 32. Exhaust/reformate mixture 32 flows into by-pass circuit 40 and/or by-pass circuit 42, as controlled by flow diverter 44. Although the regeneration of the NOx adsorbers can be simultaneous, for efficiency and effectiveness, regeneration of the NOx adsorbers can occur sequentially. In the sequential operation mode, reformate can be mixed with only a fraction of exhaust stream 4 via flow diverter 44 and the exhaust/reformate mixture flows into by-pass circuit 40, while the bulk of exhaust stream 4 flows into by-pass circuit 42.

The desulfation cycle of the desulfation system 200 is the same as for the desulfation system 100, except that the NOx adsorbers can be simultaneously or sequentially desulfated. Again, although the desulfation of the NOx adsorbers can be simultaneous, for efficiency and effectiveness, desulfation of the NOx adsorbers can occur sequentially.

Figure 5:
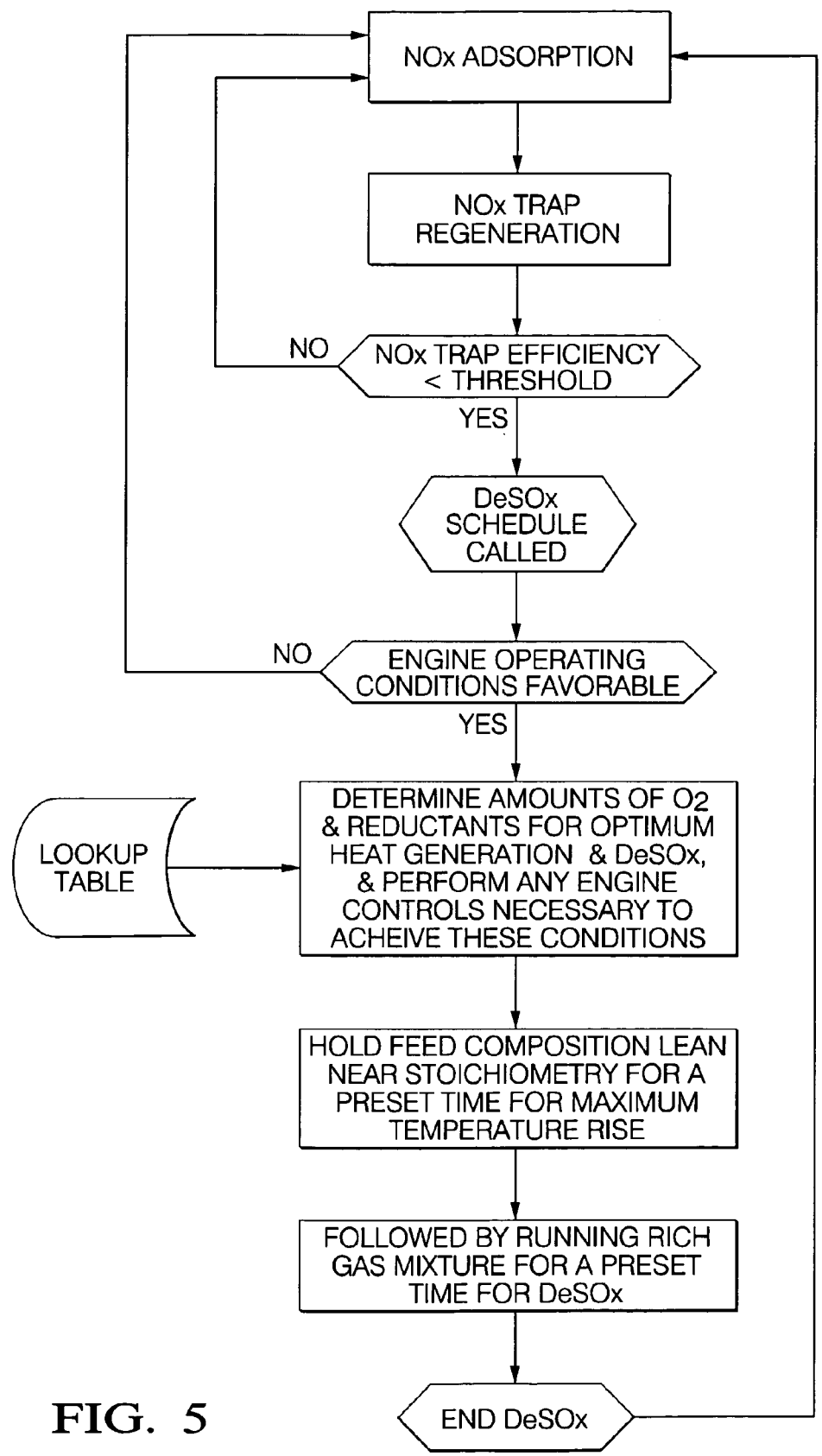
FIG. 5 is a flow diagram of an exemplary operation of the desulfation system.

Referring to FIG. 5, a flow diagram of one embodiment of the algorithm for the process controller of the desulfation system is illustrated. As can be seen from the flow diagram, NOx adsorption and regeneration can occur in a regular schedule. If the NOx trap (e.g., adsorber) efficiency is greater than a threshold, the adsorption and regeneration continue. If, however, NOx trap efficiency is not greater than the threshold, the desulfurization (DeSOx) schedule is triggered and the system is monitored to determine if the engine operating conditions are favorable for desulfation. If the conditions are not favorable, NOx adsorption and regeneration continue and the efficiency is tested. If the conditions are favorable, the amount of oxygen and reductants for optimum exotherm/DeSOx in the NOx adsorber are determined. The engine and reformer are controlled to attain the desired A/F, and the feed composition is maintained near lean stoichiometry (e.g., greater than the combustion stoichiometric A/F ratio; e.g., at greater than the combustion stoichiometric A/F ratio to about 16) for a predetermined amount of time to attain the desired temperature increase in the NOx adsorber followed by introduction of a rich gas mixture (e.g., about 13 to less than the combustion stoichiometric A/F ratio) for a predetermined amount of time for DeSOx. Once DeSOx is complete, the entire cycle starts over.

It is understood that a desulfation system could be configured without the efficiencies and process control as the system disclosed above. In addition, it is to be apparent that additional embodiments of the desulfation system may be configured to provide an exhaust/reformate mixture 32 close to ideal stoichiometry by adjusting the operating conditions of exhaust source 2 in combination with supplying reformate 10, thereby requiring less reformate than the embodiment described herein.

EXAMPLE

A simple desulfation system 100 was assembled in a configuration similar to that shown in FIG. 1, comprising an exhaust source 2, NOx adsorber 14, reformate 10, and exhaust/reformate mixture 32. The effects of sulfur poisoning on the desulfation system 100 were evaluated by simulating actual conditions. Then a desulfation cycle was conducted under conditions simulating actual use and the resulting NOx adsorber sample efficiency recovery was evaluated and reported.

The following materials were used during this experiment:

Exhaust Source 2: A synthetic diesel exhaust (also known as "lean feed") was utilized for this experiment for the purpose of understanding the exact composition of lean feed. The lean feed was supplied at a temperature of 313° C. The composition of the lean feed comprised 0.08 volume percent (vol %) CO, 0.04 vol % NO, 11.47 vol % $O_2$, 0.05 vol % $C_3H_6$, 3.00 vol % $CO_2$, 2.00 vol % $H_2O$, and balanced with $N_2$. The resulting air to fuel ratio (A/F) was 34.04.

Reformate 10: The reformate supplied to the system was bottled reformate for means of understanding the exact composition. The reformate was supplied at a rate of 0.66 standard liters per minute (slm). The composition of the reformate comprised 23.7 vol % CO, 22.1 vol % $H_2$, and 54.2 vol % $N_2$.

Exhaust/Reformate Mixture 32: Exhaust source 2 was operated first to produce a synthetic lean exhaust having a low air to fuel ratio of 16.28 in order to reduce the oxygen content in the exhaust/reformate mixture, which resulted in a reduced flow rate of 3.7 slm. In vehicle applications, this can be accomplished by throttling the air intake of the engine. The exhaust/reformate mixture (also known as "rich feed") resulting from the controlled mixing of the lean feed was supplied at a rate of 4.36 slm and at a temperature of about 300° C. and resulted in a composition comprising 3.60 vol % CO, 3.35 vol % $H_2$, 0.03 vol % NO, 1.52 vol % $O_2$, 0.08 vol % $C_3H_6$, 5.15 vol % $CO_2$, 3.44 vol % $H_2O$, and balanced with $N_2$. The resulting air to fuel ratio (A/F) was 13.18.

NOx Adsorber 14: The NOx adsorber samples were potassium-modified barium containing catalysts supported on high surface area alumina (e.g., a surface area of about 150 $m^2/g$). The catalysts comprised platinum (Pt), palladium (Pd), and rhodium (Rh) with a total loading of 100 grams per cubic foot. The Pt:Pd:Rh ratio was about 8:3:1 by weight. The catalyst was wash-coated onto a monolithic cordierite support, dried, and calcined. Prior to evaluation, samples were cut into cylinders measuring approximately 1.91 centimeters (cm) in diameter by 3.81 cm in length.

To test the desulfation system under normal operating conditions and regeneration conditions, the desulfation system was supplied with a constant flow rate of 7.5 slm of alternating lean feed and rich feed gases through the NOx adsorber sample. The flow rate of the rich gas was adjusted from 4.36 slm to 7.5 slm by increasing balance gas $N_2$ flow to eliminate the pressure pulsation during feed composition modulation.

The system was configured to operate under lean fuel, "normal operating conditions" for 27 seconds and regenerate under rich fuel conditions (release NOx) for 3 seconds, respectively. NOx gas concentration was measured before and after the NOx adsorber sample using a data acquisition system sampling at 2 hertz (Hz). Six lean-feed/rich-feed cycles were acquired and integrated, yielding an average of 92.8% NO removal efficiency at an inlet gas temperature of 313° C. for the NOx adsorber sample.

Next, the NOx adsorber sample was poisoned over the course of four hours by a lean feed gas supplied at 7.5 slm comprising 25 ppm $SO_2$, 10.00 vol % $O_2$, 3.00 vol % $CO_2$, 2.00 vol % $H_2O$, and balanced with nitrogen. This poisoning, which corresponds to 84 hours of diesel exhaust containing 25 ppm of fuel sulfur, caused more than a 50% reduction in NOx adsorber efficiency.

Figure 4:
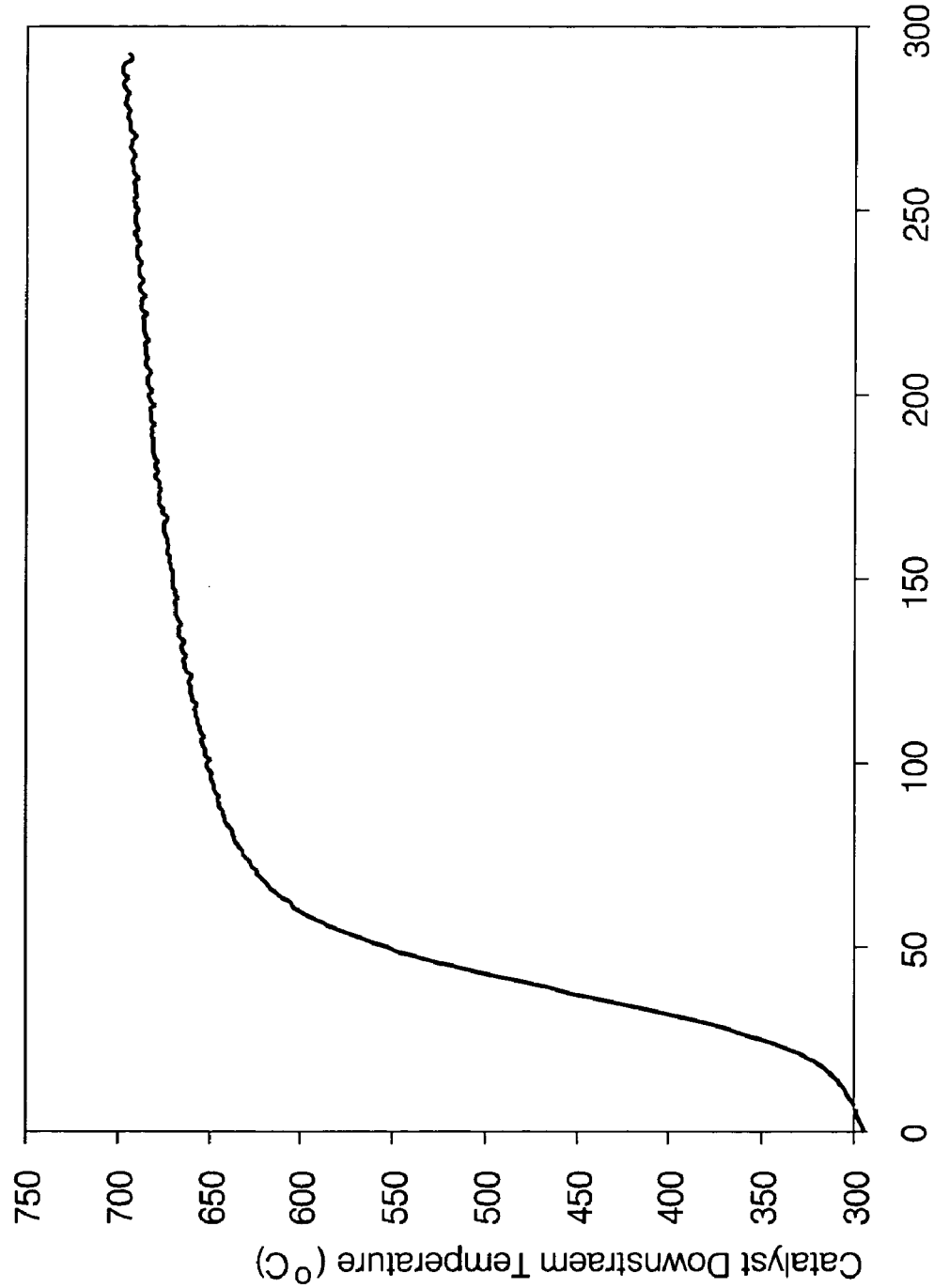
FIG. 4 is a graphical representation of the temperature rise measured at the location downstream to the catalyst during a desulfation schedule.

After sulfur poisoning, a desulfation cycle was conducted by subjecting the NOx adsorber sample to 300 seconds of rich feed gas. In order to heat NOx adsorber 14 to desulfation temperatures of about 700° C., exhaust source 2 was operated to produce a synthetic lean exhaust having an air to fuel ratio of 22.20 (the oxygen content in the lean exhaust was about 6.7 vol %) to increase the oxygen amount. Reformate was supplied at a rate of about 1.81 slm. The exhaust/reformate mixture 32 resulting from this controlled mixing of the lean feed was then supplied at a rate of 7.11 slm and at a temperature of about 300° C. and resulted in a composition comprising 6.32 vol % CO, 5.89 vol % $H_2$, 4.88 vol % $O_2$, 3.0 vol % $CO_2$, 2.0 vol % $H_2O$, and balanced with $N_2$. The resulting air to fuel ratio (A/F) was about 13.87. As can be seen in FIG. 4, the temperature of the exhaust, as measured downstream of the NOx adsorber, increased from about 300° C. at onset to about 650° C. in approximately 100 seconds, and to about 700° C. in approximately 300 seconds.

Figure 3:
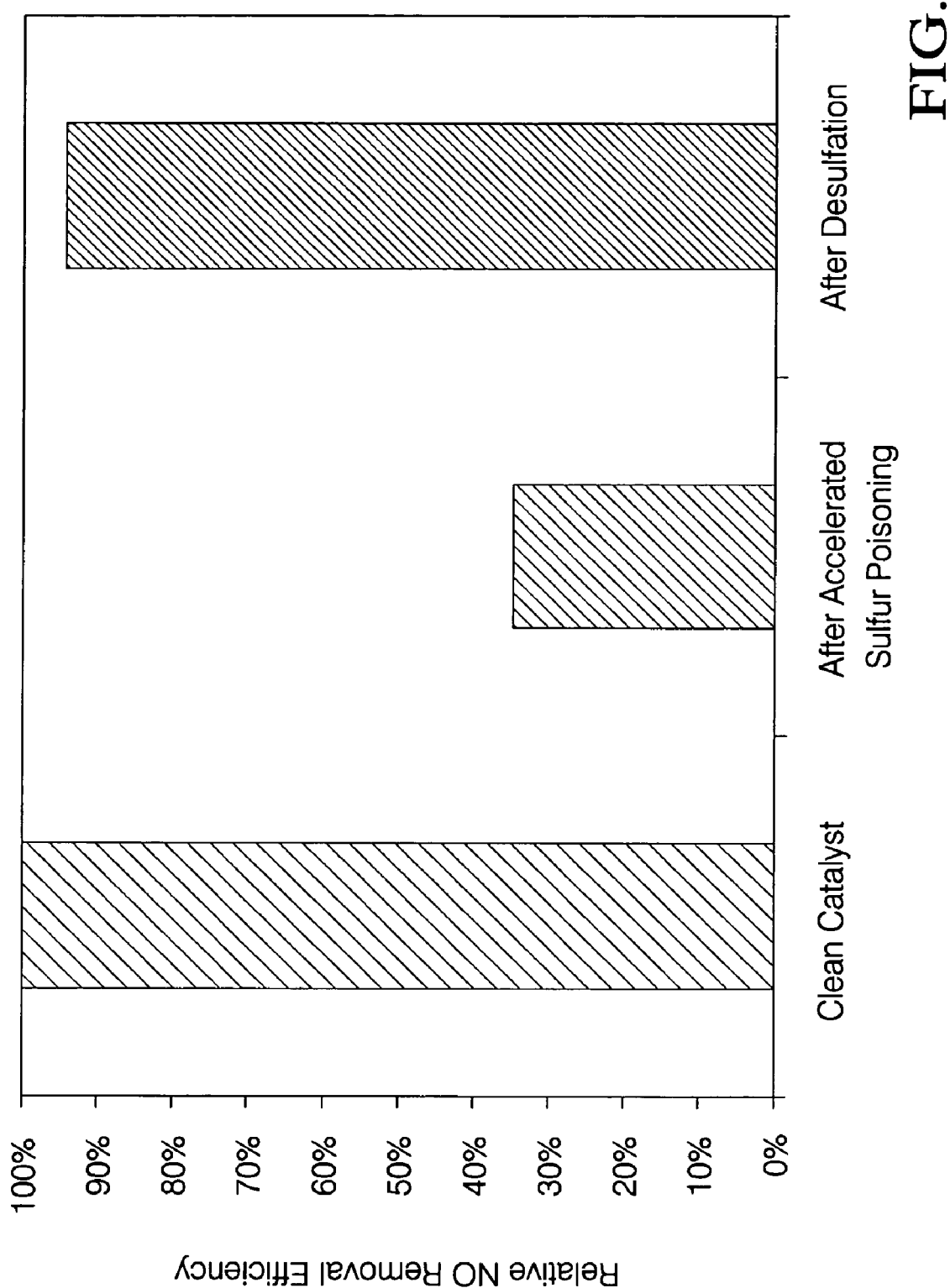
FIG. 3 is a bar chart illustrating fresh, sulfur poisoned, and desulfated NOx adsorber.

After the desulfation cycle, the NOx adsorber sample was returned to normal operating mode with an alternating regeneration mode as described above. As can be seen in FIG. 3, the efficiency of the NOx adsorber sample was re-evaluated and recovered to greater than or equal to about 60% of the original, more specifically, efficiency has been shown to recover to greater than or equal to about 70% of the original, even more specifically, efficiency has been shown to recover to greater than or equal to about 80% of the original, and yet more specifically, efficiency has been shown to recover to greater than or equal to about 94% of the original efficiency.

By employing a desulfation, NOx adsorber efficiency can be recovered after sulfur poisoning, enabling the use of fuels comprising sulfur impurities without additional filters, sulfur traps or similar additional equipment. Additionally, the system is capable of desulfation without additional equipment or complexity. The system employs the components utilized for regeneration to attain the desulfation temperatures.

The disclosed method can be embodied in the form of computer or controller implemented processes and apparatuses for practicing those processes. It can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the method. The method may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the method. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or NOx abatement or treatment system to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for operating an exhaust system, comprising:
   determining a stream temperature of an exhaust stream;
   desulfating the NOx adsorber, wherein desulfating comprises
      determining an amount of oxygen needed to increase an initial temperature of a NOx adsorber to a desulfation temperature of greater than or equal to about 600° C.;
      producing reformate comprising hydrogen and carbon monoxide in an on-board reformer;
      introducing the amount of oxygen to the NOx adsorber; and
      introducing a sufficient amount of reformate to the NOx adsorber to attain an air to fuel ratio that is less than a combustion stoichiometric ratio;
      wherein the oxygen and reformate react, creating an exotherm and increasing the temperature of the NOx adsorber to the desulfation temperature, and wherein, at the desulfation temperature, a sulfur material in the NOx adsorber is released and reacts with the reformate.

2. The method of claim 1, wherein the sufficient amount of oxygen is an oxygen concentration in the exhaust stream of about 5 vol % to about 11 vol. %, based upon a total volume of the exhaust steam.

3. The method of claim 2, wherein the oxygen concentration is about 6 vol. % to about 9 vol. %.

4. The method of claim 3, wherein the oxygen concentration is about 7 vol. % to about 8 vol. %.

5. The method of claim 1, wherein the desulfation temperature is about 650° C. to about 800° C.

6. The method of claim 5, wherein the desulfation temperature is about 700° C. to about 750° C.

7. The method of claim 1, further comprising determining if operating conditions are favorable for desulfating the NOx adsorber by determining if the stream temperature is greater than or equal to 200° C., wherein if the stream temperature is greater than or equal to 200° C., desulfating the NOx adsorber, and if the stream temperature is less than 200° C., normal operation continues for a period of time before the stream temperature is reevaluated.

8. The method of claim 7, wherein normal operation comprises introducing a lean exhaust stream to the NOx adsorber and adsorbing NOx from the lean exhaust stream in the NOx adsorber, and wherein the method further comprises regenerating the NOx adsorber by introducing a rich exhaust stream to the NOx adsorber and desorbing NOx.

9. The method of claim 8, further comprising determining an efficiency of the NOx adsorber, and
   if the efficiency is less than a threshold, determining if the operating conditions are favorable for the desulfating, and if the conditions are favorable, desulfating the NOx adsorber; and if the conditions are not favorable, continuing the normal operations; and if the efficiency is greater than or equal to the threshold, continuing the normal operations.

10. The method of claim 1, wherein introducing a sufficient amount of reformate to the NOx adsorber further comprises, introducing a sufficient amount of reformate to the NOx adsorber to attain the air to fuel ratio that is less than the combustion stoichiometric A/F ratio.

11. The method of claim 10, wherein introducing a sufficient amount of reformate to the NOx adsorber further comprises, introducing a sufficient amount of reformate to the NOx adsorber to react with the oxygen and form the desired exotherm at a lean A/F ratio, and then introducing additional reformate to the NOx adsorber to attain the air to fuel ratio that is less than the combustion stoichiometric A/F ratio.

12. A method for operating an exhaust system, comprising:

normally operating the exhaust system, wherein normally operating comprises
  introducing a lean exhaust stream to the NOx adsorber; and
  adsorbing NOx from the lean exhaust stream in the NOx adsorber;
regenerating the NOx adsorber, wherein regenerating comprises introducing a rich exhaust stream to the NOx adsorber; and desorbing NOx; and
desulfating the NOx adsorber, wherein desulfating comprises:
  determining an amount of oxygen needed to increase an initial temperature of a NOx adsorber to a desulfation temperature of greater than or equal to about 600° C.;
  producing reformate comprising hydrogen and carbon monoxide in an on-board reformer;
  introducing the amount of oxygen to the NOx adsorber; and
  introducing a sufficient amount of reformate to the NOx adsorber to attain an air to fuel ratio that is less than a combustion stoichiometric A/F ratio;
  wherein the oxygen and reformate react, creating an exotherm, and wherein a sulfur material is released.

13. The method of claim 12, wherein prior to desulfating further comprising determining an efficiency of the NOx adsorber, wherein
  if the efficiency is greater than or equal to a threshold, continuing to normally operate the exhaust system;
  if the efficiency is less than a threshold,
    determining if operating conditions are favorable for desulfating the NOx adsorber, wherein
      if the conditions are not favorable, continuing to normally operate the exhaust system; and
      if the conditions are favorable, desulfating the NOx adsorber.

14. The method of claim 13, wherein if the efficiency was less than the threshold, and the conditions were not favorable for desulfation, continuing to normally operate the exhaust system for a period of time and then reevaluating whether conditions are then favorable for desulfation.

15. The method of claim 14, wherein determining if operating conditions are favorable for desulfating the NOx adsorber comprises:
  determining a stream temperature of an exhaust stream; and
  determining if the stream temperature is greater than or equal to 200° C., wherein
    if the stream temperature is greater than or equal to 200° C., desulfating the NOx adsorber, and
    if the stream temperature is less than 200° C., continuing to normally operate the exhaust system.

16. The method of claim 15, wherein the desulfation temperature is about 650° C. to about 800° C.

17. The method of claim 16, wherein the desulfation temperature is about 700° C. to about 750° C.

18. A storage medium encoded with a machine readable computer program code, the code including instructions for causing a computer to implement a method for operating an exhaust system, comprising:
  determining a stream temperature of an exhaust stream;
  desulfating the NOx adsorber, wherein desulfating comprises
    determining an amount of oxygen needed to increase an initial temperature of a NOx adsorber to greater than or equal to about 550° C.;
    producing reformate comprising hydrogen and carbon monoxide in an on-board reformer;
    introducing the amount of oxygen to the NOx adsorber; and
    introducing a sufficient amount of reformate to the NOx adsorber to attain an air to fuel ratio that is less than a combustion stoichiometric A/F ratio;
    wherein the oxygen and reformate react, creating an exotherm and wherein a sulfur material is released.

19. The storage medium of claim 18, wherein the method further comprises determining if operating conditions are favorable for desulfating the NOx adsorber by determining if the stream temperature is greater than or equal to 200° C., wherein if the stream temperature is greater than or equal to 200° C., desulfating the NOx adsorber, and if the stream temperature is less than 200° C., normal operation continues for a period of time before the stream temperature is reevaluated.

20. The storage medium of claim 18, wherein the method further comprises determining an efficiency of the NOx adsorber, and
  if the efficiency is less than a threshold,
    determining if the operating conditions are favorable for the desulfating, and
    if the conditions are favorable, desulfating the NOx adsorber; and
    if the conditions are not favorable, continuing the normal operations; and
  if the efficiency is greater than or equal to the threshold, continuing the normal operations.

* * * * *